(12) United States Patent
Gill et al.

(10) Patent No.: US 7,308,160 B2
(45) Date of Patent: Dec. 11, 2007

(54) HIGH SPEED SEMICONDUCTOR WAVEGUIDE PHASE-SHIFTER

(75) Inventors: Douglas M Gill, South Orange, NJ (US); Christi K Madsen, Hearne, TX (US); Conor S Rafferty, New York, NY (US)

(73) Assignees: Lucent Technologies Inc., Murray Hill, NJ (US); Noble Devices Technologies, Newark, NJ (US)

( * ) Notice: Subject to any disclaimer, the term of this patent is extended or adjusted under 35 U.S.C. 154(b) by 71 days.

(21) Appl. No.: 11/161,744

(22) Filed: Aug. 15, 2005

(65) Prior Publication Data

US 2006/0045522 A1    Mar. 2, 2006

Related U.S. Application Data

(60) Provisional application No. 60/601,723, filed on Aug. 16, 2004.

(51) Int. Cl.
*G02F 1/025* (2006.01)
(52) U.S. Cl. .......................................... 385/3; 385/129
(58) Field of Classification Search .................. None
See application file for complete search history.

(56) References Cited

U.S. PATENT DOCUMENTS

| | | | | |
|---|---|---|---|---|
| 4,093,345 A | * | 6/1978 | Logan et al. ............. | 385/2 |
| 4,787,691 A | * | 11/1988 | Lorenzo et al. .......... | 385/3 |
| 4,958,898 A | * | 9/1990 | Friedman et al. ........ | 385/3 |
| 4,997,246 A | * | 3/1991 | May et al. ................ | 385/2 |
| 6,798,552 B2 | * | 9/2004 | Tada .................. | 359/248 |
| 6,801,676 B1 | * | 10/2004 | Liu ...................... | 385/3 |
| 2002/0093717 A1 | | 7/2002 | Paniccia et al. | |
| 2005/0089257 A1 | * | 4/2005 | Barrios et al. .......... | 385/2 |

OTHER PUBLICATIONS

S. Lee et al. Analysis and design of high-speed high-efficiency GaAs-AlGaAs double-heterostructure waveguide phase modulator. IEEE Journal of Quantum Electronics, vol. 27, No. 3, pp. 726-736, Mar. 1991.☐☐*
A. Cutolo et al. Silicon electro-optic modulator based on a three terminal device integrated in a low-loss single-mode SOI waveguide. Journal of Lightwave Technology, vol. 15, No. 3, pp. 505-518, Mar. 1997.*
Ansheng Liu, et al., "A high-speed silicon optical modulator based on a metal-oxide-semiconductor capacitor," Nature, Feb. 22, 2004, pp. 615-618.
D. Marris et al., "High-speed Si-based optical modulator for on-chip optical interconnects," Interconnect Tech. Conf. Proceedings, Jun. 7, 2004, pp. 122-124.
D. Marris et al., "Design of a SiGe-Si Quantum-Well Optical Modulator," IEEE Journal of Selected Topics, May 2003, pp. 747-748.

* cited by examiner

*Primary Examiner*—Rodney Bovernick
*Assistant Examiner*—Mike Stahl

(57) ABSTRACT

A semiconductor waveguide includes a section containing free charge, either electrons or holes, which can be steered into or removed from the path of the beam under the control of electrical signals. The mobile charges come from a potential well which may be either filled or depleted under electrical control. When the well is filled, the charges speed the beam propagation, introducing a phase change. When the well is emptied the beam propagates with extra delay. The phase shifter allows very high speed modulation of the beam using low voltage and low power electronics. The device can be created using standard silicon processing techniques, and integrated with other optical components such as splitters and combiners to create amplitude modulators, attenuators and other optical devices.

20 Claims, 10 Drawing Sheets

US 7,308,160 B2

HIGH SPEED SEMICONDUCTOR WAVEGUIDE PHASE-SHIFTER

CROSS-REFERENCE TO RELATED APPLICATIONS

The present application is based on and claims priority from U.S. Provisional Patent Application No. 60/601,723, which was filed Aug. 16, 2004 and which is incorporated herein by reference in its entirety.

FIELD OF THE INVENTION

The present invention relates to the field of high-speed optical communications, and in particular, to phase shifter devices that can vary the phase of optical signals in accordance with electrical signals.

BACKGROUND INFORMATION

Data in optical communication is often encoded by modulation of the intensity of a beam of light. Such amplitude modulation can be achieved by combining a selectively delayed copy of a light beam with itself. When the copy of the light beam is subjected to a phase delay of $\pi$ radians and combined with the original light beam, destructive interference occurs, yielding minimum output intensity. When the copy of the light beam is subjected to no phase delay, constructive interference occurs, yielding maximum output intensity. An optical phase-shifter device under the control of electrical signals can be used to selectively delay the light beam in accordance with a stream of data, thereby amplitude modulating the output light in accordance with the data.

Various devices have been developed to modulate the intensity of a light beam. Lithium niobate ($LiNbO_3$) modulators can be fast and have reasonable voltage requirements, however, they are not polarization independent and do not lend themselves to integration of drive electronics and optical components. Integrated doped silica waveguides, also known as silicon optical bench components, offer polarization independence and a high degree of integration, however, their highest switching speeds are only in the 1 MHz range. Semiconductor modulators (InP or GaAs) can have a 40 GHz bandwidth; however, polarization independence and extensive integration of multiple channels and other components are not easily achieved with this technology. Silicon modulators consisting of silicon waveguides embedded in silica allow extensive integration; however, designs to date have had a rather low phase change per unit voltage and length, requiring either a high operating voltage or a large device. Many existing designs also dissipate a high degree of static power, for instance, P-I-N devices which have current flowing continuously through the device in order to maintain a steady concentration of carriers.

SUMMARY OF THE INVENTION

In an exemplary embodiment of a device in accordance with the present invention, a semiconductor waveguide includes, in the path of the light beam, at least one region that can be filled or depleted of free charge carriers under the control of electrical signals to selectively subject the light beam to a delay. When the at least one region is filled with carriers, the carriers speed the beam propagation, thereby subjecting the light beam to a minimal delay. When the at least one region is emptied of free charge carriers, however, the light beam propagates more slowly and is thus phase-shifted with respect to the minimally delayed condition. The at least one region is formed by moderately doping one or more portions of the waveguide. The at least one region is depleted of free charge carriers when a reverse bias is applied to a PN junction proximate to the region. Removing the reverse bias allows the free charge carriers to re-fill the region. The free charge carriers can be selected to be electrons or holes.

Advantageously, a phase-shifter device in accordance with the present invention can modulate the phase of an optical beam over a wide range, at high speeds, with low optical losses, and at low voltages and power consumption. Further advantageously, a device in accordance with the present invention can be readily designed to modulate orthogonally polarized beams of light at the same or different rates. The device of the present invention lends itself to integration with other components such as waveguides, splitters, combiners and integrated electronics and can be manufactured using practical, reliable and cost-effective manufacturing methods.

DETAILED DESCRIPTION

Figure 1:
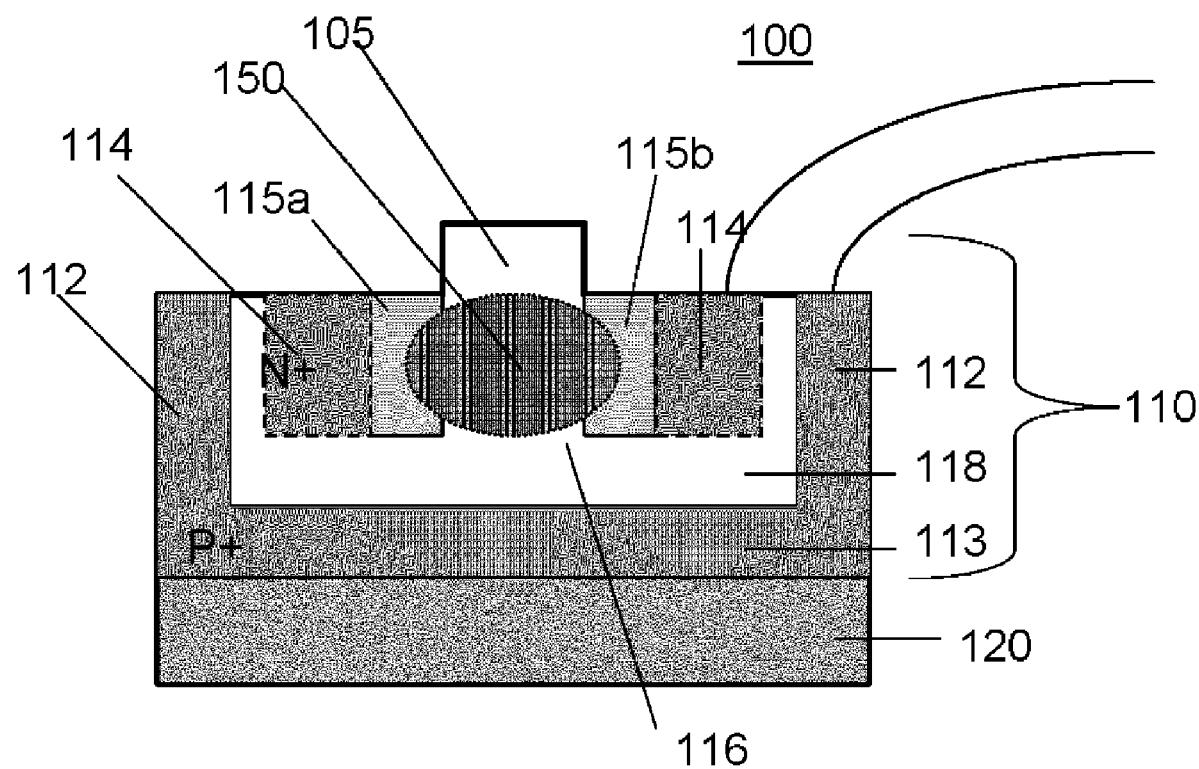
FIG. 1 is a cross-section of an exemplary embodiment of a phase-shifter device in accordance with the present invention.
Figure 2:
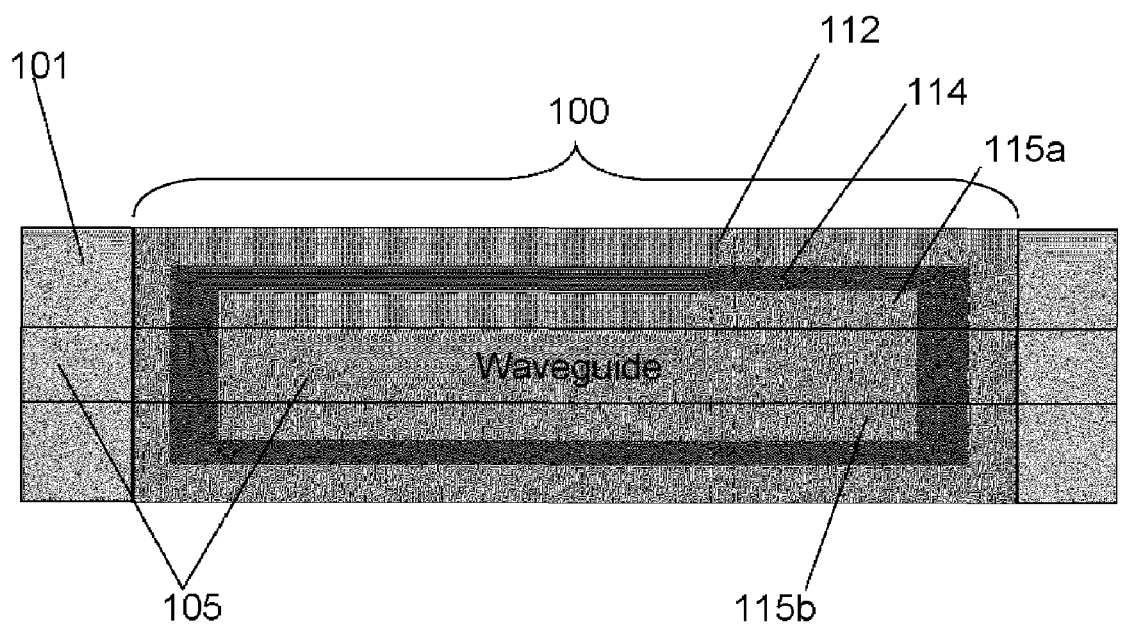
FIG. 2 is a plan view of the phase-shifter device of FIG. 1.

An exemplary embodiment of a phase shifting device 100 in accordance with the present invention is shown in cross section in FIG. 1 and in plan view in FIG. 2. The exemplary device shown uses a silicon rib waveguide 110 on a buffer layer 120 of silica ($SiO_2$). A rib 105 is formed on the upper surface of the silicon rib waveguide 110. As shown in FIGS. 1 and 2, the silicon rib waveguide 110 has an outer region 112 and a base region 113 that are heavily P-type doped surrounding an inner region 114 that is heavily N-type doped. The heavily P-doped outer region 112 extends down to the heavily P-doped base region 113 whereas the heavily N-doped inner region 114 extends partially down into the silicon waveguide 110. Contacts are provided to the regions 112 and 114 to allow the application of a voltage there across, as described more fully below. To prevent leakage currents, the heavily doped regions 112 and 114 are preferably separated by a small gap as opposed to making direct contact with each other.

As shown in FIG. 1, the heavily N-doped region 114 surrounds doped regions 115a, 115b, which are separated by a core region 116 generally lying under the rib 105. In the exemplary embodiment shown, the regions 115a, 115b are doped P-type to a moderate concentration, described more fully below. Unlike the heavily doped regions 12, 114, the regions 115a, 115b are not provided with electrical contacts and thus do not make external electrical contact. The heavily N-doped region 114, the moderately P-doped regions 115a, 115b and the core region 116 are located above a region 118. The rib 105, the core region 116, and the region 118 are preferably undoped or very lightly doped. As shown in FIG. 2, the cross-section of the path of the light beam, also referred to as the "optical mode" 150 is primarily confined to the regions 115a, 115b and 116 and will likely extend partly up into the rib 105 and down into the region 118. The optical mode 150 may also partly extend into the heavily doped regions to a limited extent. The shape of the optical mode 150 is determined primarily by the shape of the waveguide, including the width and height of the rib 105. The speed at which the optical mode travels, however, will vary with the concentration of free carriers in the regions through which it travels.

The PN junction between the P and N regions 112 and 114 allows carriers to be removed or added to the regions 115a and 115b located at least partially in the optical mode 150. The moderately doped regions 115a, 115b on either side of the core region 116 provide potential wells where free charge carriers collect. With no reverse bias applied across the PN junction, these potential wells are full of carriers, in this embodiment, holes. As a result, a light beam passing through the device experiences a minimum of delay. When a reverse bias is applied, i.e., the N-doped region 114 is at a higher potential than the P-doped regions 112 and 113, the carriers are depleted out of the regions 115a, 115b. As a result, a light beam passing through the device is subjected to a greater delay and is thus phase shifted relative to the minimum delay condition.

The optimal dimensions of the various features of the exemplary device of FIGS. 1 and 2 will depend on a variety of considerations. For example, as discussed below, the widths of the well regions 115a, 115b will affect the reverse bias voltage required to deplete the regions of carriers. In an exemplary embodiment, the regions 115a, 115b are approximately 0.08 µm wide. The regions 114 and 115a, 115b are approximately 0.3 µm deep, with their bottoms approximately 0.7 µm above the silica layer 120. The width of the rib 105 is approximately 0.5 µm and the length of the device 100 is approximately 1.0 mm. The optimal distance of the well regions 115a, 115b from the waveguide core is subject to competing considerations. The closer the wells approach the optical mode 150, the more the tail of the optical mode will overlap with the heavy doping in regions 114, and the more absorption loss there will be. The further the wells are removed from the core, the less influence they have on the speed of propagation. In an exemplary embodiment, the edge of each well 115a, 115b is within 0.1 µm of the proximal edge of the rib 105, either inside or outside of the rib footprint. The vertical heights of the well regions 115a, 115b and the heavily doped regions 114 are chosen to be on the order of 0.1-1 µm to allow sufficient overlap with the optical mode 150 while permitting the buried p-type layer 113 to retain electrostatic control of the wells.

In addition to the aforementioned dimensions, other considerations in designing a device in accordance with the present invention are the choice of free carriers and their concentration. Although the above-described embodiment uses holes as the free carriers, either electrons or holes can be used. Where electrons are designed to be the free carriers, the doping polarities of the various regions (112, 114, 115a, b) need to be reversed. At higher doping levels, the change in phase caused by depletion of the wells is more pronounced. Increasing the doping concentration, however, will require a higher voltage to achieve carrier depletion and will increase absorption losses in the waveguide. With increasing hole concentrations, the change in absorption is larger than the change in refractive index, while for electrons both parameters increase at about the same rate.

The length of the waveguide required to achieve a phase shift of $\pi$ radians is designated $L\pi$. This yields an overall absorption loss of $\Delta\alpha L\pi$, with the absorption loss per length, $\Delta\alpha$, depending on the free carrier concentration. Exemplary values for these parameters for a uniform free carrier profile across the waveguide optical mode are shown in Table I for holes and electrons as the free carriers.

TABLE I

| Waveguide Doping $\Delta N$ (cm$^{-3}$) | Holes $L\pi$ (mm) | $\Delta\alpha L\pi$(dB) | Electrons $L\pi$(mm) | $\Delta\alpha L\pi$(dB) |
| --- | --- | --- | --- | --- |
| $10^{17}$ | 2.3 | 0.6 | 8.8 | 3.2 |
| $10^{18}$ | 0.36 | 0.96 | 0.88 | 3.2 |
| $10^{19}$ | 0.058 | 1.5 | 0.088 | 3.2 |

The values listed in Table I indicate that with holes as the free carriers, both the length required for a $\pi$ radian phase change is shorter, and the absorption occurring in that length is smaller than with electrons. In addition, longer lengths and lower doping improve the trade-off between phase change and absorption for holes. Exemplary devices in accordance with the present invention can have a wide range of doping concentrations beyond those listed in Table I (e.g., $10^{16}$ to $10^{19}$ ions/cm$^3$).

Potential wells doped at the above-indicated concentrations can be readily depleted using reasonable reverse-bias voltages, e.g., 40 volts or less. The voltage necessary to deplete a region of doping concentration N and width W is on the order of $qNW^2/2\in$, where $\in$ is the silicon dielectric constant and q is the electron charge. For example, for a doping concentration of $10^{18}$ cm$^{-3}$ and a width of 0.08 µm, the necessary voltage is approximately 5V.

Figure 3A:
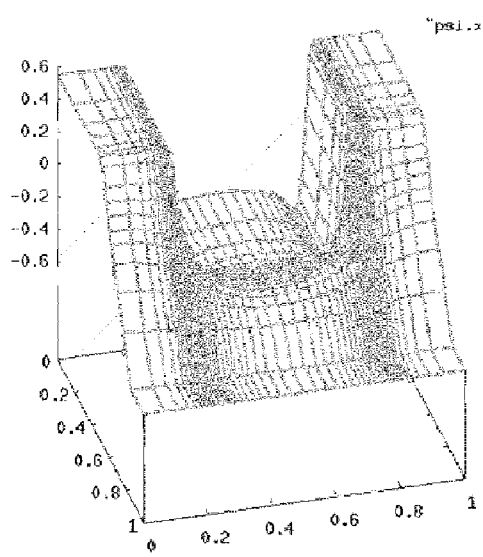
FIGS. 3A and 3B show simulation results illustrating the electrostatic potential across a central portion of an exemplary device of the present invention, without and with reverse bias applied, respectively.
Figure 3B:
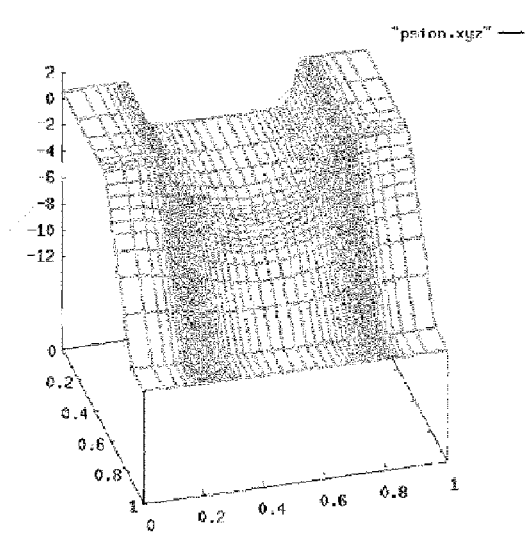

FIGS. 3A and 3B show potential diagrams of a central portion of an exemplary device in accordance with the present invention, including the highly N-doped regions (114) and the potential wells (115a, 115b). The vertical axis is electrostatic potential and the two lateral axes are position left-to-right and front-to-back, with dimensions in microns. The bottom of the device is towards the front and the top of the device (rib area) is partially hidden from view. The diagram of FIG. 3A shows the potential when no bias is applied. The two N+ regions (114) correspond to the high potential areas to the left and right whereas the highly P-doped region (113) corresponds to the lowest potential area. The well regions (115a, 115b) correspond to the potential dips on either side of the center, inside and below the N+ regions (114). When reverse bias is applied, as illustrated in FIG. 3B, the center area is raised relative to the back, the dips become flattened and the holes are forced out.

A phase-shifter device in accordance with the present invention can be very fast. Carriers can reach the potential well in a time of approximately L/vsat, where vsat is the saturation velocity and L is the spacing between the regions 115a, 115b and the nearby heavily doped layer 113. The time to fill or deplete the potential wells is therefore on the order of a few picoseconds.

The energy per switching event is approximately V∆Q, where ∆Q is the total charge removed. The power consumed by an exemplary device with the aforementioned dimensions operating at 1 GHz and with a reverse-bias voltage of 5 V is therefore on the order of 25 mW. A feature of the device of the present invention is that the junctions are either in reverse or no bias. This differs from commonly found P-I-N devices which are operated in forward bias in the on-state, thereby causing significant current flow. With the device of the present invention, no current flows either in the on-state (reverse bias) or the off-state (no voltage), but only during the transition between the two states.

Figure 3C:
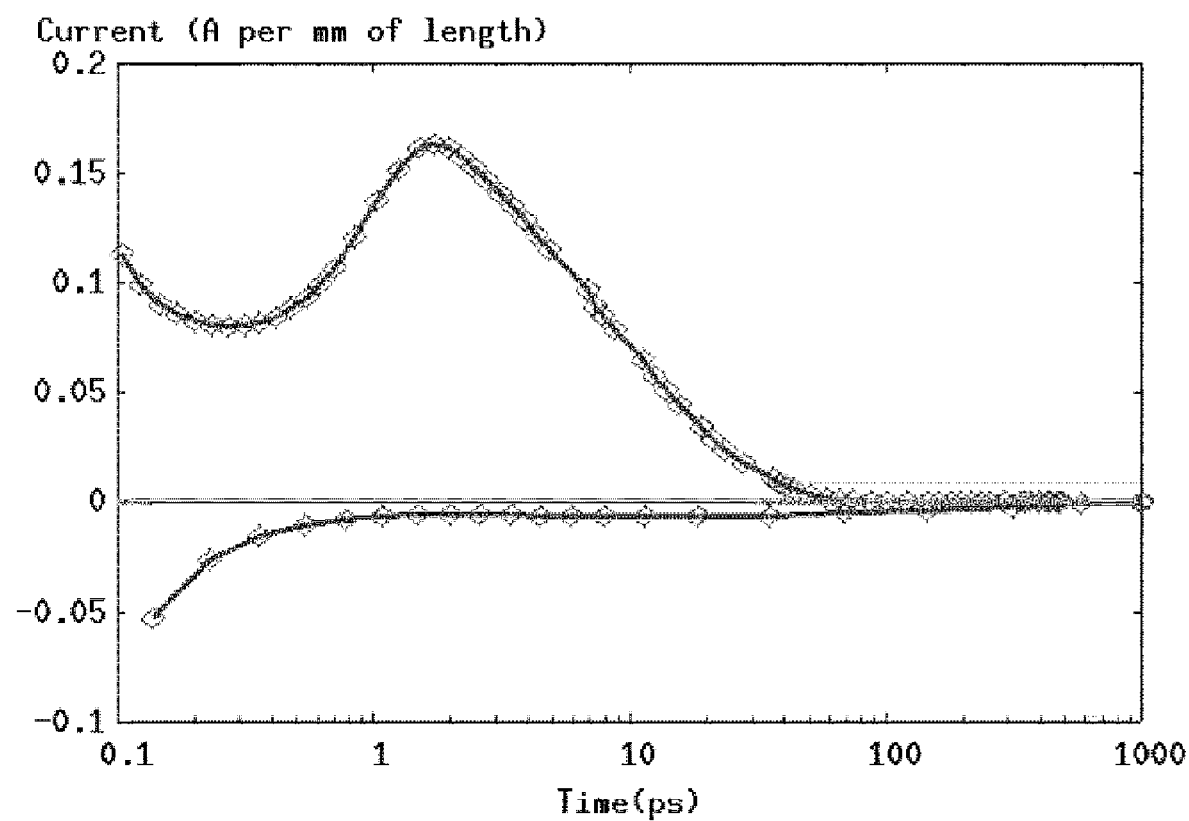
FIG. 3C is a graph illustrating the speed of operation of an exemplary phase-shifter device of the present invention as predicted by a simulation thereof.

The results of an electrical simulation of an exemplary phase shifter device are illustrated graphically in FIG. 3C. In the simulation, a pulse of reverse bias is applied to the device, and then removed. The upper trace shows current flowing into the device at the rising edge of the pulse, whereas the lower trace shows current flowing out of the device at the falling edge of the pulse. The simulations support the aforementioned predicted results. Both on and off current transients are over in considerably less than 1 ns, and the energy per transition is approximately 10 pJ.

The phase shift and absorption in Table I were determined for a uniform concentration of free carriers in the optical mode. In the device of FIG. 1, the light beam will not encounter a uniform carrier concentration. Rather, the carriers and changes in carrier concentration will tend to be localized in the wells and the induced change in refractive index and absorption loss are to some extent polarization dependent. There is a controlled, partial overlap of the potential wells (115a, 115b) with the waveguide core (116). The phase shift and absorption will be correspondingly higher in proportion to the amount of overlap of the free carrier well with the optical mode.

The propagation of vertically and horizontally polarized light through the device of the present invention can be tailored to be the same or to be different by tailoring features of the waveguide and the doping. In the exemplary bilateral well structure of the embodiment of FIG. 1, horizontally polarized light will experience a larger phase shift than vertically polarized light. Thus the degree of well filling can be adjusted to cause a 180° phase shift for horizontally polarized light (and near complete cancellation when mixed with an undelayed split beam), while vertically polarized light will propagate with a smaller phase shift (and thus will not fully cancel when mixed with the a split beam). If a more symmetric well structure is used, e.g., with wells above and below as well as to the left and the right of the core (see, e.g., FIG. 6C), both polarizations can be shifted by the same degree. By adjusting the degree of the overlap in the horizontal and vertical directions, the phase difference between horizontally and vertically polarized light can be adjusted at will.

In the exemplary embodiment of FIG. 1, increasing the height of the rib 105 will generally tend to slow down the transverse magnetic (TM) mode more than the transverse electric (TE) mode for the exemplary waveguide dimensions discussed. In general, the TE and TM polarizations are impacted differently by changing the waveguide dimensions or shape: a wide waveguide that is not tall will slow down the TE polarization (higher TE effective optical index) and speed up the TM (lower TM optical index) whereas a narrow structure that is tall will have an opposite effect. An unstrained square waveguide will have the same effective index for the TM and TE polarizations. The rib structure follows this general rule, but since the structure is more complicated, the impact is a little less obvious. The overlap of the doped regions 115a, 115b with the optical mode 150 affects the change in the effective refractive index for each polarization as a function of the change in carrier concentration in the optical mode. By modifying the rib waveguide and doping profiles appropriately, the polarization dependence of the device response can be minimized or maximized.

Figure 4A:
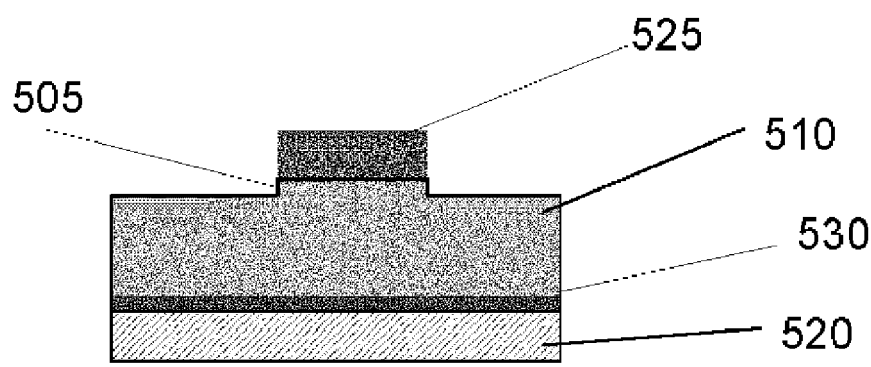
FIGS. 4A through 4D schematically illustrate an exemplary process flow to create an exemplary phase-shifter device in accordance with the present invention.

An exemplary method for forming a device 500 in accordance with the present invention will now be described with reference to FIGS. 4A through 4D. In FIG. 4A, a rib 505 is formed on the upper surface of a layer of silicon 510 arranged on an insulator substrate 520, such as silica. The rib 505 is patterned using a hard mask 525 made of a dielectric material commonly used in silicon processing. The dielectric hard mask 525 is left in place after the rib 505 has been formed, and acts as a template for the subsequent formation of sidewalls, described below. The silicon layer 510 is undoped or very lightly doped except along its bottom, where a conductive layer 530 formed of a high concentration of P-type dopants is located. The dopants may be introduced by ion implantation or other methods familiar to those skilled in the art.

Figure 4B:
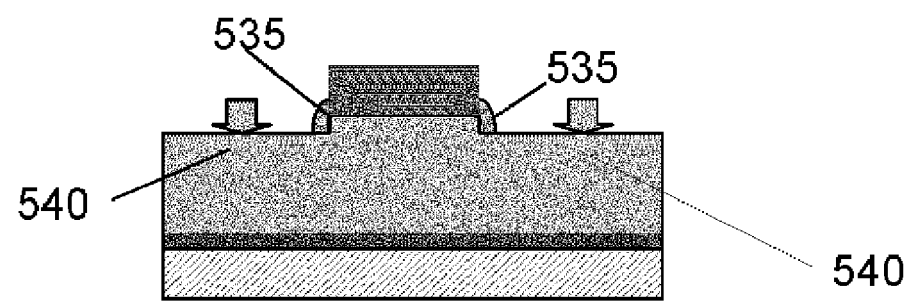

A second dielectric is then deposited onto the device and etched. The material of the second dielectric is chosen so that it can be selectively etched without removing the first dielectric used in the hard mask 525. For example, the first dielectric material might be silicon nitride ($Si_3N_4$) and the second dielectric might be silicon dioxide ($SiO_2$). The etch is stopped when the second dielectric has been removed from the horizontal surfaces of the device but remains on the vertical sides of the rib 505. As illustrated in FIG. 4B, sidewalls 535 made of the second dielectric are thereby formed on either side of the rib 505. The sidewalls 535 may or may not also extend at least partially up the vertical faces of the hard mask 525.

After the sidewalls 535 are formed, P-type dopant ions are implanted, to a moderate dose, to create P-type regions 540. Preferably, the dopant ion concentration in the resultant P-type regions 540 is on the order of $10^{17}$ to $10^{18}$ ions/cm$^3$. The dielectric hard mask 525 and the sidewalls 535 exclude the P-type dopant ions from the core of the waveguide, with the thickness of the sidewalls 535 dictating the lateral positions of the P-type regions 540 relative to the rib 505.

Portions of the regions 540 adjacent to the waveguide core correspond to the aforementioned uncontacted P-doped regions 115a, 115b of the exemplary device of FIG. 2. Due to lateral scatter of the dopant implantation as well as dopant diffusion, the regions 540 (and thus 115a, 115b) may spread sidewise, possibly as far as the area under the rib 105. The width of the sidewalls 535 and the dopant implantation and annealing recipes can be adjusted to give the desired overlap of the doped regions 540 with the optical mode. The widths of the sidewalls 535 can be controlled to within a small fraction of the film thickness using the above-described sidewall formation procedure. This is much better than lithographic tolerances and allows excellent lateral position control. With this technique, the un-contacted doped regions of free carriers (regions 115a, 115b, in FIG. 2) can be created with widths of approximately 0.1 µm and with control better than approximately 0.01 µm, without requiring lithographic features finer than approximately 0.5 µm.

Figure 4C:
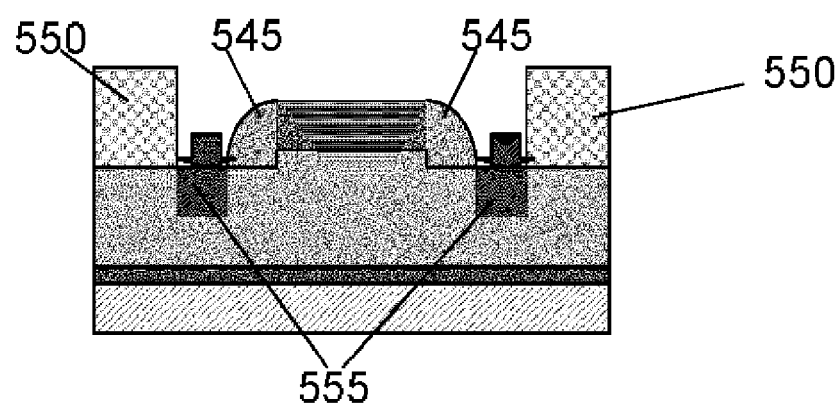

The above-described sidewall formation procedure is repeated, with the second dielectric being applied to a greater thickness than in the first sidewall formation procedure. The second dielectric is then etched away from the horizontal surfaces of the device, and as shown in FIG. 4C, a second set of sidewalls 545 is formed, the sidewalls 545 being wider than the first sidewalls 535. The sidewalls 545 can be formed over the sidewalls 535 or the sidewalls 535 can be removed before the sidewalls 545 are formed.

An implant mask 550 is then applied and N-type dopant ions are implanted at a high concentration to form N-doped regions 555 (corresponding to region 114 in FIG. 1). The larger thickness of the sidewalls 545 causes the resultant N-type regions 555 to be formed further from the waveguide core, thereby minimizing static losses in the waveguide core.

Figure 4D:
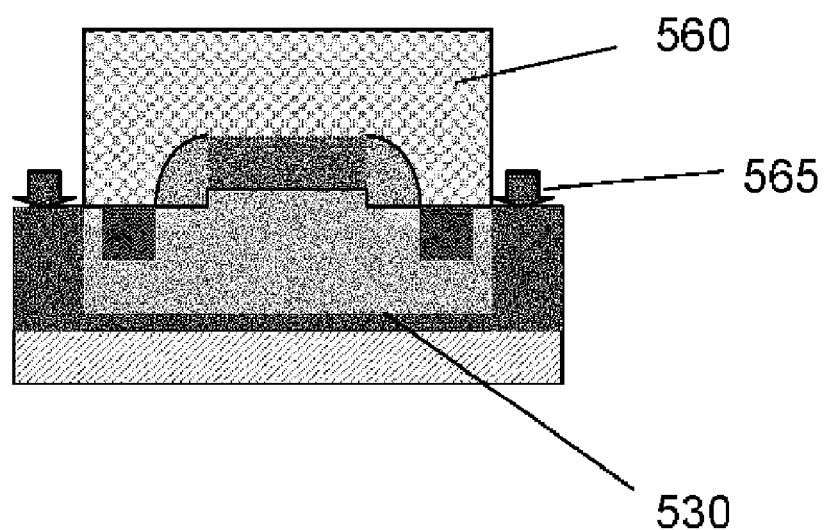

As shown in FIG. 4D, a further implant mask 560 is then applied and P-type dopant ions are implanted at a high concentration to form regions 565, which extend down to the buried conductive P-type layer 530. The result is a device having a structure as illustrated in FIG. 1.

The device can then be completed using well known techniques. Dielectric layers can be used to cover the device and via holes created in the dielectric where metal wiring is needed to contact the highly doped N-type and P-type layers. Metal layers are deposited and patterned to create the necessary wiring, using standard processing methods.

As shown in FIG. 2, the exemplary phase-shifter device 100 of the present invention can be implemented over a portion of a length of semiconductor waveguide 101 by selectively doping the waveguide to form the device 100. A variety of configurations can thus be formed, including, for example, multiple phase-shifter devices arranged in series along a length of semiconductor waveguide, or multiple parallel waveguides with phase-shifters on a single silicon layer.

Although the present invention has been shown and described with respect to a particular process flow, it should be understood that many other similar process flows may be used to achieve substantially the same structure, and may be used without departing from the scope of the present invention.

Although exemplary embodiments of the present invention have been shown and described with respect to a silicon waveguide and silicon-compatible dielectrics and metals, it should be understood that any semiconductor material system might be used, without departing from the scope of the present invention.

Moreover, although the present invention has been shown and described with respect to a silicon-on-insulator (SOI) substrate embodiment, a conventional silicon substrate may also be used, without departing from the scope of the present invention. The substrate should be covered with a dielectric material, and then conventional dielectric patterning and selective epitaxial lateral overgrowth (ELO) processes may be used to create single-crystal silicon waveguides above the dielectric layer. Such an embodiment is illustrated in FIG. 5.

Figure 5:
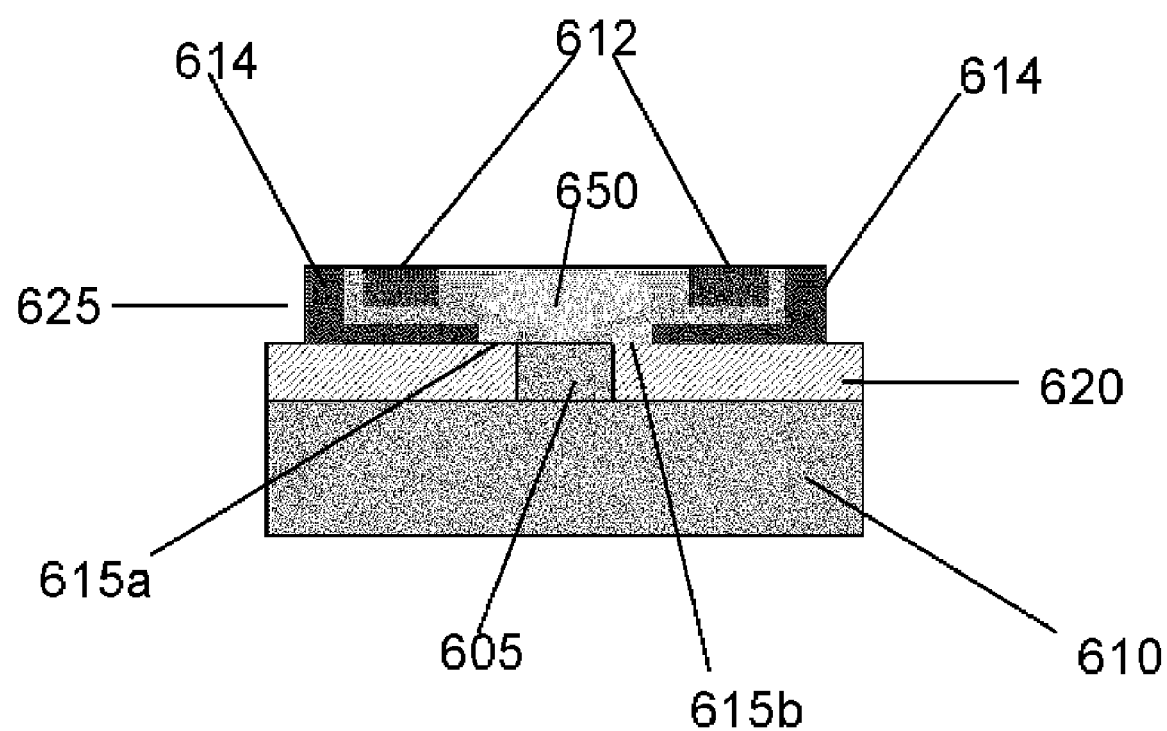
FIG. 5 shows a cross-section of a further exemplary embodiment of a phase-shifter device in accordance with the present invention.

In the embodiment of FIG. 5, a silicon substrate 610 is covered with a layer 620 of silica. A hole is formed in the silica and a silicon rib 605 is grown up through the hole and out laterally 625, through the process of epitaxial lateral overgrowth (ELO). Chemical-mechanical polishing can be used to planarize the top surface of the silicon waveguide as needed. Heavily P-doped regions 612 and heavily N-doped regions 614, which correspond to the regions 112 and 114 of the embodiment of FIG. 1, are formed in the silicon layer 625 through the usual processes of ion implantation and annealing. P-doped regions 615a, 615b provide the wells of free carriers which are depleted upon reverse bias of the heavily doped P and N regions, 612 and 614. The optical mode is shown as 650.

As with the other embodiments, electrons can be used instead of holes as the free carriers and the doping polarities of the device reversed. Furthermore, although the present invention has been shown and described with respect to a single crystal silicon waveguide, a polysilicon or amorphous silicon waveguide may also be used without departing from the scope of the present invention.

Figure 6A:
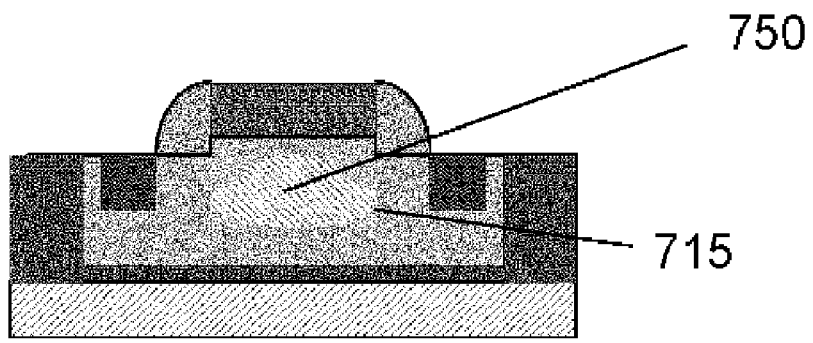
FIGS. 6A through 6C show further exemplary embodiments of a phase-shifter device in accordance with the present invention having various depletion well configurations.
Figure 6B:
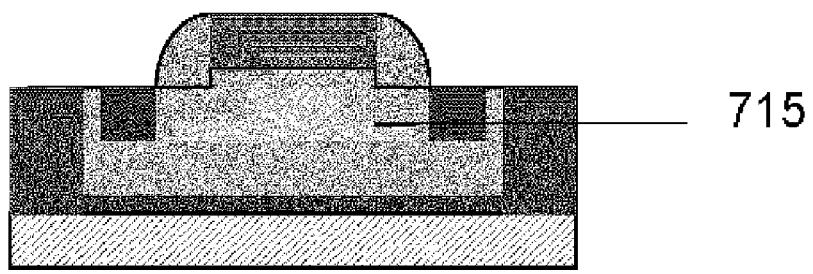

Although the present invention has been shown and described with respect to a particular doping profile with two wells (e.g., 115a, 115b) on either side of a waveguide core, it should be understood that any doping profile which permits a partial or complete overlap of a potential well with the waveguide, where the potential well may be emptied or filled under the control of external electrodes, may be used without departing from the scope of the present invention. For example, a single central well overlapping the waveguide core may also be used. Such an embodiment is illustrated in FIG. 6A, wherein a single central well 715 substantially overlaps the waveguide core. FIG. 6B illustrates yet another exemplary embodiment of a phase-shifting device having a single central well 715 that is T-shaped, with the vertical portion (or tongue) of the "T" overlapping the waveguide core.

Figure 6C:
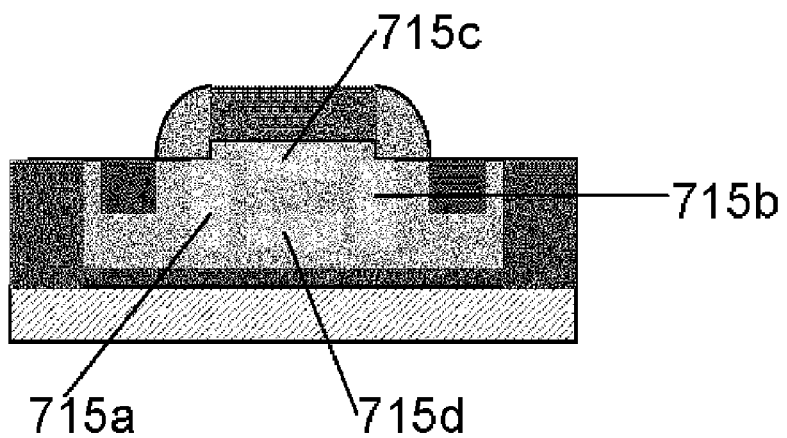

FIG. 6C illustrates an exemplary embodiment with a four-well profile, with wells 715a and 715b to the left and right of the waveguide core and wells 715c and 715d above and below the waveguide core.

An exemplary device having an N-well profile, where $N \geq 2$, in which the wells surround the waveguide core, is within the scope of the present invention.

Figure 7:
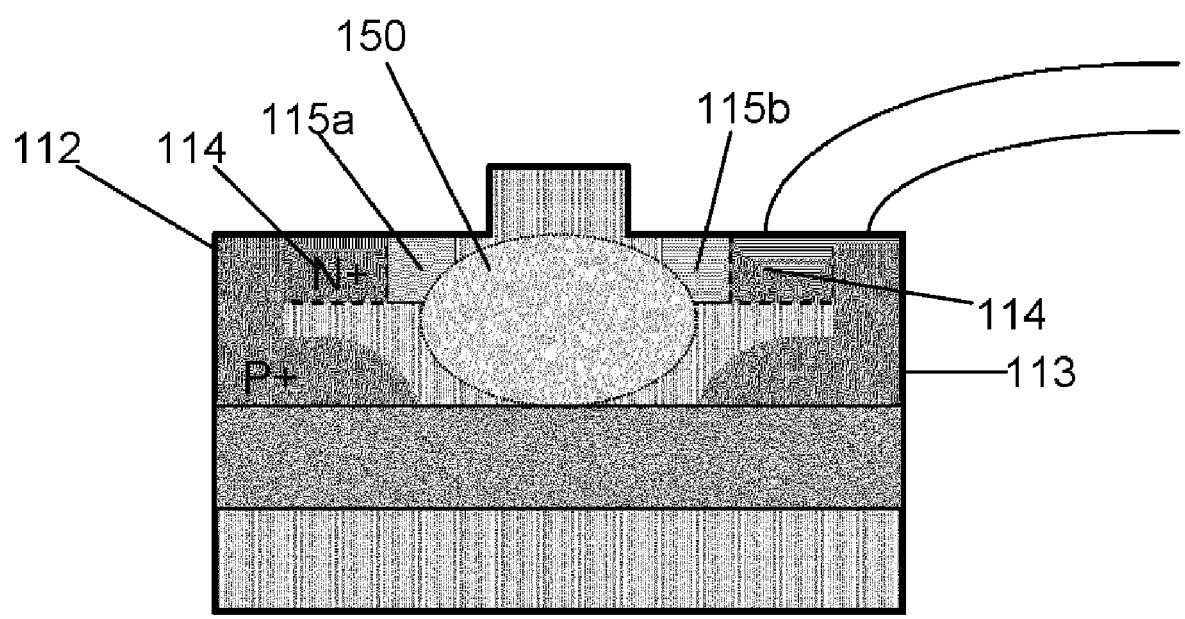
FIG. 7 shows a cross-section of yet a further exemplary embodiment of a phase-shifter device in accordance with the present invention.

FIG. 7 illustrates a modification of the embodiment of FIG. 1 in which a gap is provided in the heavily P-doped bottom region 113. The gap reduces the absorption of the light beam passing through the waveguide while minimally impacting the transport of free carriers to and from the potential wells 115a and 115b. In the exemplary device of FIG. 7, the regions 115a and 115b are approximately 0.08 µm wide. The thickness of the silicon layer 110 (without the rib 105) is approximately 0.2 µm. The depth of the regions 114, 115a and 115b is approximately 0.08 µm.

Figure 8:
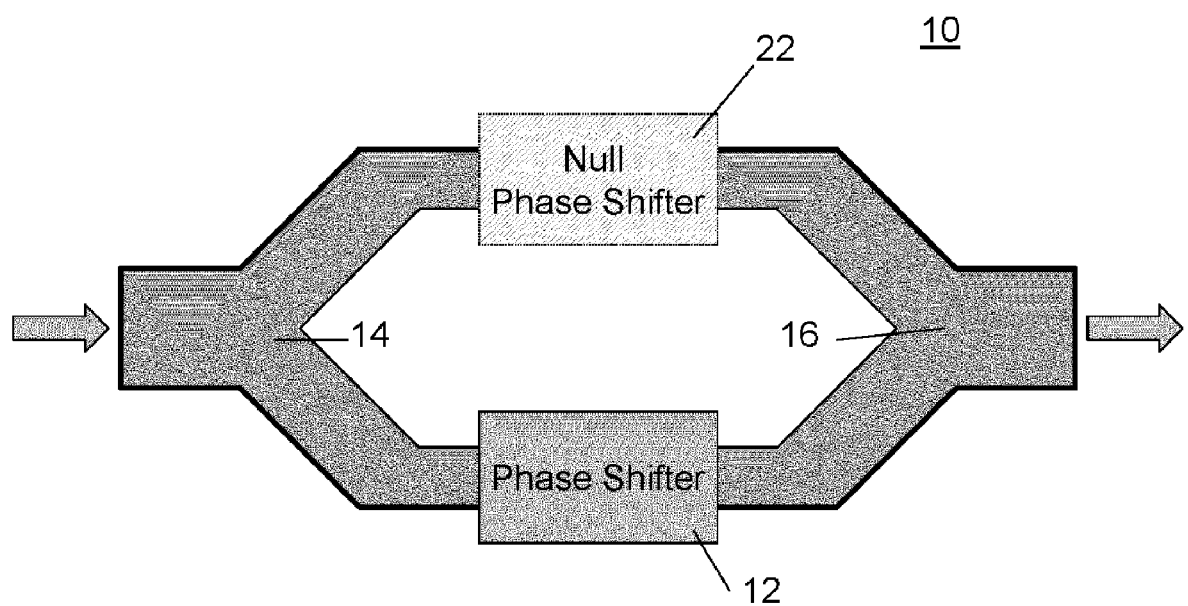
FIG. 8 is a schematic representation of a typical modulator incorporating a phase-shifter device and an optional null phase-shifter.

A phase-shifter device of the present invention may be combined with other elements to create a modulator. FIG. 8 shows a block diagram of a typical modulator 10 using a phase-shifter device 12 in one arm of a beam that has been split. A splitter 14 splits an input beam into two arms, one of which has the phase-shifter device 12 in line therewith, which selectively subjects its respective portion of the beam to a phase shift. The other arm does not include a phase-shifting device and nominally introduces no phase shift. The phase-shifted and un-shifted beams of the two arms are combined by a combiner 16 and output from the modulator 10. If the beam in the phase-shifted arm is shifted by π radians, it will interfere destructively with the beam in the other arm and no or little output will result. If the beam is not shifted, it will interfere constructively, and a nearly complete replication of the input beam will appear at the output, apart from inevitable losses due to coupling at the waveguides and propagation losses in the waveguides and phase-shifter device.

Optionally, a null phase-shifter 22 can be included in the un-shifted arm of the modulator 10. The null phase-shifter 22 is preferably a duplicate of the phase shifter 12 but it is in an operating state in which the delay through it is minimized. As such, when the phase-shifter 12 is not activated to introduce a delay, the two arms will experience similar same propagation delays and losses, thereby maximizing constructive re-combination. It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An optical phase-shifter device comprising:
    a waveguide, wherein the waveguide includes:
        an optical mode portion, the optical mode portion allowing a light beam to pass there through, and
        a doped region, wherein the doped region contains free charge carriers and overlaps the optical mode portion; and
    a semiconductor structure, wherein the semiconductor structure includes:
        a first highly doped region, wherein the first highly doped region is arranged proximate to the doped region and is doped with a polarity opposite to that of the doped region,
        a second highly doped region, wherein the second highly doped region is doped with a polarity similar to that of the doped region, and
        an intervening region, wherein the intervening region is substantially free of dopants and is arranged between the doped region and the second highly doped region so as to prevent contact between the doped region and the second highly doped region,
    wherein the semiconductor structure controls the free charge carrier content of the doped region in accordance with an external electrical control potential applied across the first and second highly doped regions.

2. The device of claim 1, wherein the doped region includes a P-doped region and the free charge carriers include holes.

3. The device of claim 1, wherein the optical mode portion of the waveguide includes a core region, the core region being substantially free of dopants.

4. The device of claim 3, wherein the waveguide includes two doped regions, the two doped regions being arranged on opposite sides of the core region.

5. The device of claim 3, wherein the waveguide includes more than two doped regions surrounding the core region.

6. The device of claim 1, wherein the optical mode portion of the waveguide includes a core region, the core region overlapping the doped region.

7. The device of claim 6, wherein the doped region has a T-shape with the vertical portion of the T overlapping the optical mode portion.

8. The device of claim 1, wherein the semiconductor structure includes a P-doped region and an N-doped region and wherein the free charge carrier content of the doped region is reduced when a reverse bias voltage is applied across the P-doped region and the N-doped region.

9. The device of claim 8, wherein the reverse bias voltage is no more than 40 volts.

10. The device of claim 1, wherein the light beam is subjected to a phase shift of $\pi$ radians.

11. The device of claim 1, wherein the doped region has a dopant ion concentration on the order of $10^{16}$ to $10^{18}$ ions/cm$^3$.

12. The device of claim 1, wherein the waveguide includes a rib structure, the rib structure being arranged on an upper surface of the waveguide proximate to the optical mode portion.

13. The device of claim 1, wherein the second highly doped region includes a lower layer, the lower layer being separated from the doped region by a substantially undoped region.

14. The device of claim 13, wherein the lower layer of the second highly doped region includes a gap therein, the gap being arranged proximate to the core region.

15. The device of claim 1 comprising a silicon-on-insulator structure.

16. The device of claim 1 comprising an epitaxial structure.

17. A method of operating a waveguide in which the speed of propagation through the waveguide is a function of the amount of free charge carriers in a doped region of the waveguide, the method comprising:
    propagating a light beam through an optical mode portion of the waveguide, wherein the optical mode portion overlaps the doped region; and
    controllably reducing the amount of free charge carriers in the doped region by applying a potential difference to a semiconductor structure proximate to the doped region, the semiconductor structure including:
        a first highly doped region, wherein the first highly doped region is arranged proximate to the doped region and is doped with a polarity opposite to that of the doped region,
        a second highly doped region, wherein the second highly doped region is doped with a polarity similar to that of the doped region, and
        an intervening region, wherein the intervening region is substantially free of dopants and is arranged between the doped region and the second highly doped region so as to prevent contact between the doped region and the second highly doped region.

18. The method of claim 17, wherein the region includes a P-doped region and the free charge carriers include holes.

19. The method of claim 17, wherein the light beam is phase shifted by $\pi$ radians.

20. The method of claim 17, wherein the potential difference applied is no more than 40 volts.

* * * * *